Feb. 6, 1951 | A. A. COHEN ET AL | 2,540,654

DATA STORAGE SYSTEM

Filed March 25, 1948 | 3 Sheets-Sheet 1

Inventors
Arnold A. Cohen,
William R. Keye, &
Charles B. Tompkins,
By Cushman, Darby & Cushman
Attorneys.

Feb. 6, 1951 A. A. COHEN ET AL 2,540,654

DATA STORAGE SYSTEM

Filed March 25, 1948 3 Sheets-Sheet 2

Inventors
Arnold A. Cohen,
William R. Keye, and
Charles B. Tompkins,

By Cushman Darby & Cushman
Attorneys.

WRITING CIRCUIT

Inventors
Arnold A. Cohen,
William R. Keye, &
Charles B. Tompkins,
By Cushman, Darby & Cushman
attorneys.

Patented Feb. 6, 1951 2,540,654

UNITED STATES PATENT OFFICE 2,540,654

DATA STORAGE SYSTEM

Arnold A. Cohen and William R. Keye, St. Paul, Minn., and Charles B. Tompkins, Washington, D. C., assignors to Engineering Research Associates, Inc., Arlington, Va., a corporation of Minnesota Application March 25, 1948, Serial No. 16,998

31 Claims. (Cl. 235—61)

The present invention relates to data storage systems and, more particularly, to systems wherein data is magnetically stored.

In numerous lines of endeavor, for example, computing and recording, it is desirable to store certain information for various periods of time and yet have the information readily available for reading or alteration. By transposing information into electrical pulses and applying these pulses to magnetizable areas of a drum or other member rotatable or movable at high speed, the data will be readily accessible for reading or reproduction, particularly by means of certain controls included in the present invention. In addition, by means of various controls included in the invention, data can be readily applied to any desired portion of a track on the movable member, or any selected item of data in a track can be located and read, altered or erased.

An object of the invention is to provide a system for recording, reading and altering the data on the moving member with complete accuracy and so that any portion of the data will be almost instantly available for either recording, reading or alteration.

Another object of the invention is to provide controls whereby items of data may be recorded within extremely small cells or areas of the magnetizable surface of the moving member so that a tremendous amount of data may be stored upon a relatively small member.

A still further object of the invention is to provide a system for storing information in such a manner that the storage will be fixed and non-volatile but, nevertheless, the information can be altered whenever it is desired to do so.

Attainment of the last-mentioned object renders the invention particularly important in fields requiring storage of data for long periods and where it is undesirable to maintain a source of power in operation for indefinite periods. Electronic systems for storing data are, of course, open to the objection that the data may be lost by any interruption of the source of power.

A further object of the invention is to provide a highly accessible arrangement for magnetically storing and transmitting data by signals based on a digital or other code.

Another object is to provide a system whereby a data storing apparatus can be controlled by, or control other apparatus.

Other objects and advantages of the invention will be apparent from the following specification and accompanying drawings wherein.

Figure 1:
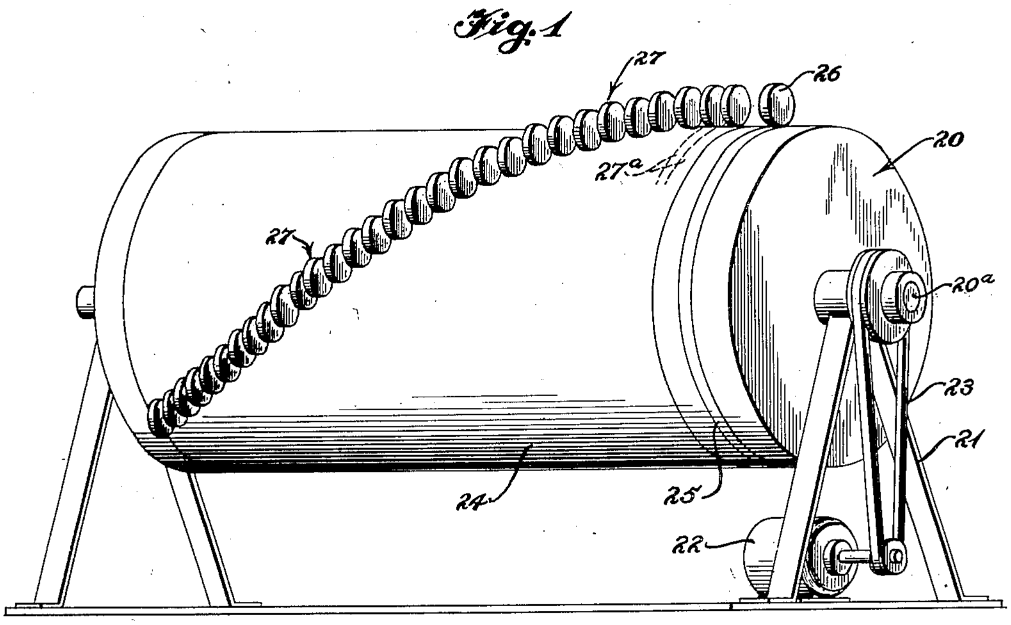
Figure 1 is a perspective view illustrating a rotary drum and magnets associated therewith.

Referring to Figure 1, the numeral 20 designates a rotary drum or moving member suitably mounted in journal bearings diagrammatically illustrated at 21 and driven by a motor 22, for example, through a belt designated at 23. During periods when data is being placed upon or taken from the drum, the motor will continuously rotate the drum. By way of example, the drum 20 may have a diameter of thirty-four inches and be approximately ten-and-a-half inches wide. The drum is formed of aluminum or other generally non-magnetic material. By machining the periphery of the drum after it has been mounted in the journals 21, the eccentricity of the drum may be held to a minimum, for example, an eccentricity of .0007 inch.

The structure of Figure 1 is disclosed and claimed in the application No. 16,997 of John M. Coombs and Charles B. Tompkins for Data Storage Apparatus, filed of even date herewith.

The periphery of drum 20 will be covered with magnetic tape 24, for example, iron oxide coated paper tape. Figure 1 illustrates a separate band or track 25 of magnetic tape adjacent one end of the drum for use as a timing or synchronizing pattern track. However, the timing track 25 may be formed integrally with the body 24 of magnetic tape.

Motor 22 may be so geared to the shaft 20a that the drum will be rotated at speeds ranging from 200 to 1500 inches per second. Generally speaking, the speed of rotation of the drum is limited only by the motor speed because no problem of tape adherence to the drum occurs even at the highest speed just mentioned.

As is diagrammatically illustrated in Figure 1, a plurality of magnets will be positioned adjacent the periphery of the drum 20, the magnets being so spaced lengthwise of the drum that each magnet will be opposite a track or band of the drum. In this way, each magnet will scan or record upon a drum track of predetermined width. The magnets will be capable of energization by a varying signal current. Figure 1 illustrates the magnets arranged along a line extending helically of the drum periphery. However, this showing is purely diagrammatic and, in the usual installation, all of the magnets will be arranged along a line extending parallel to the drum axis, although adjacent magnets may be offset with respect to each other circumferentially of the drum to permit them to cooperate with tracks, bands or paths closely spaced lengthwise of the drum. It will be understood that the magnets will be held fixed by suitable mounting members, not shown, and so that the periphery of the drum will be scanned or recorded upon by the magnets as the drum periphery moves past the magnets.

One magnet 26 is mounted opposite the timing pattern track 25 and may be referred to as a timing magnet. The other magnets 27 will scan or record upon predetermined tracks or bands 27a of the drum. Because the magnets 27 will be used to determine or create patterns of electrical values corresponding to digits or other code signals, they may be conveniently referred to as digital magnets and the corresponding tracks 27a may be termed digital tracks.

While Figure 1 illustrates a single magnet for each track of the drum, it will be understood that, if desired, each track may have separate reading, recording and obliterating magnets associated therewith.

Figure 5:
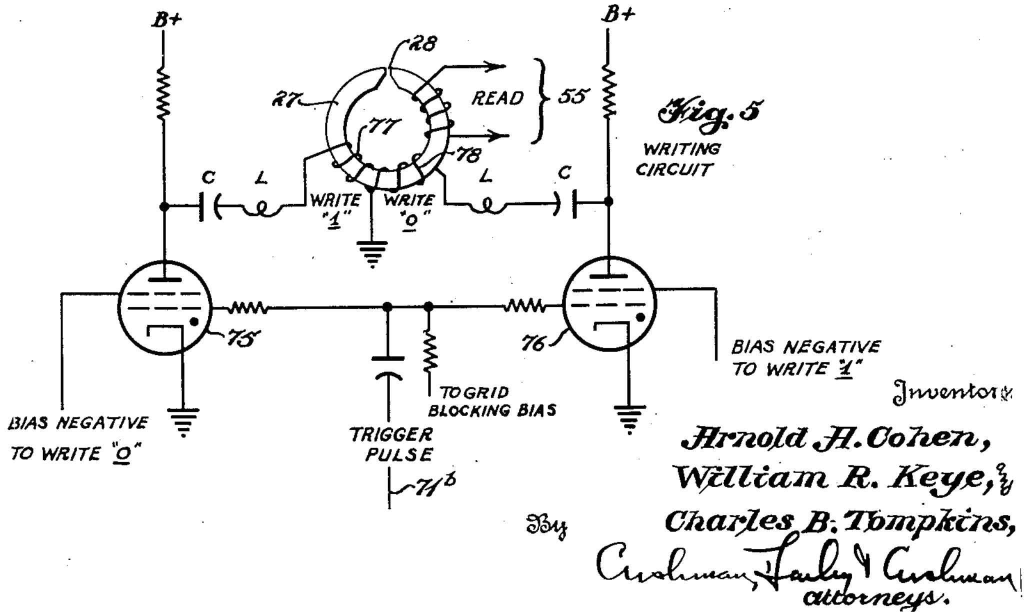
Figure 5 is a diagram of circuits included in the invention.

Each of the magnets will be of the ring-like form indicated at 27 in Figure 5 and will include a gap 28 of the order of .003 inch in width. The gap of each magnet will be positioned immediately adjacent the drum periphery, the clearance between the magnet and the drum periphery being of the order of .002 inch.

Entirely satisfactory results have been obtained by having each magnet read, record, or erase a track approximately one-quarter of an inch wide. It will be perceived from this that with a drum ten-and-a-half inches wide, it is entirely practical to provide tracks for forty digital magnets 27 and one timing signal magnet 26. As is hereinafter pointed out, the cells or areas for digit representing signals can be positioned together as closely as fifty to the inch circumferentially of the drum or lengthwise of the tracks 27a. With a drum thirty-four inches in diameter, each track will have a length circumferentially of the drum of 106.8 inches, meaning that each track may include 5,340 cells. Furthermore with forty tracks, one for each digital magnet, the entire drum will carry well over 200,000 digital cells. With motor 22 rotating drum 20 at such rate that the drum periphery will have a speed of 1,400 inches per second, it will be appreciated that the magnets can scan the drum at the rate of 70,000 digital cells per second.

The speed of rotation of the drum 20, the number of cells per inch on a track, as well as the rate at which the magnets may scan the drum, obviously determine the time required for access to any desired cell. By increasing the number of magnets or heads associated with the drum tracks, or the speed of drum rotation, access time may be decreased. Correspondingly, access time may be decreased by reducing the diameter of the drum, although the storage capacity of the drum will also be thereby decreased unless the number of tracks is increased.

The timing path or track 25 will ordinarily have a sine wave signal applied thereto at a frequency of one-half the frequency of the cells in each digital track 27a. The value of the magnetization may be such that the signal induced by the timing track at the above-mentioned track velocity of 1,400 inches per second will be approximately 100 millivolts peak to peak.

As is hereinafter described, the digital tracks 27a are adapted to receive in each cell a magnetization or element of the data representing pattern of varying value, for example, positive or negative. In this way, binary digital signals of a coded system may be used, with one value represented "1" and the other value representing "0". The cells of the digital tracks 27a will ordinarily be so arranged or timed circumferentially of the drum that they will be synchronized with the sine wave pattern of the timing track 25. Hence, by coordinating the signal received from the timing track 25 with the reading, recording, or altering of the pattern of a digital track, any cell in a digital track can be readily located for recording therein, for reading, or for alteration.

It will be understood that the term "cell" is used to define an area of a track of a size to receive a magnetization of one value, viz., one element of the data representing pattern. The term does not necessarily mean that the tracks would be provided with discrete magnetizable areas.

As will be clear from the following description, the present system is applicable in parallel path or channel computing in which several digits forming a number are transmitted simultaneously over as many electrical channels. Thus, magnetizations for a thirty digit number may be entered simultaneously into the respective cells of thirty paths or tracks. In somewhat more detail, by coordinating the readings from the timing track 25 with the rotation of the drum and the reading, recording or erasing action of the digital magnets 27, the timing track 25 and its magnet 26 serve to locate any cell in a digital path 27a or the corresponding cells of a number of digital paths 27a.

The system is equally applicable to serial operation in which, for example, the successive digits of data might be recorded or read in sequence on one or more channels of the drum.

Figure 2:
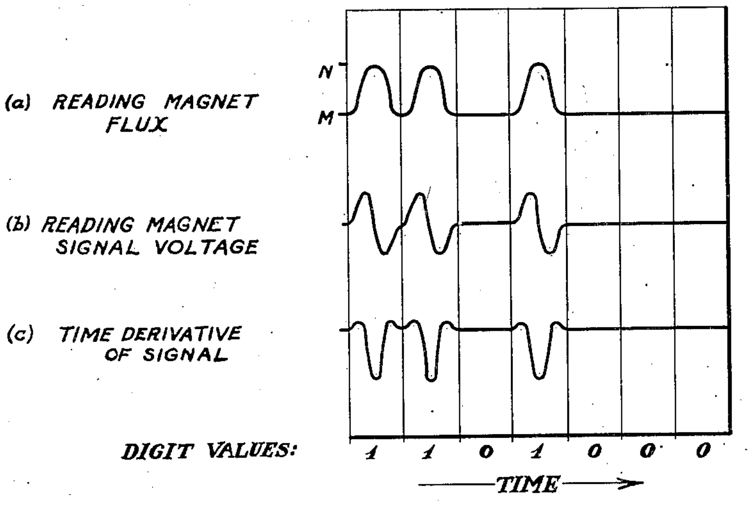
Figure 2 is a table showing the pattern of induced signals obtained during one use of the invention.

The system of the present invention may use either discrete or non-discrete signals induced upon the tracks 27a. Figure 2 represents patterns formed with the use of discrete signals upon a track 27a. In this figure, the horizontal coordinate is time and the distance between adjacent vertical lines represents the time required for one cell of a digital track to pass beneath a magnet. A series of seven cells is represented, with the cells successively containing pulses corresponding to the digits 1, 1, 0, 1, 0, 0, 0. The wave form of the flux created in the core of a magnet 27 when scanning this group of cells is shown at (*a*) in Figure 2. To a first approximation, the time plot of the flux resembles the space plot of the intensity of magnetization along the track. It will be observed that the flux remains at one level M to indicate a 0 but shifts momentarily to the other level N to indicate a 1. Even if a series of 1's occurs, the flux shifts back to the M, or 0, level at the end of each cell period. Hence, this system may be termed a "return-to-zero" type of pattern, viz., one in which the magnetized areas on the track corresponding to individual digits are discrete or separated.

Still referring to Figure 2, (*b*) of that figure indicates the E. M. F. induced in the winding of a magnet 27a. If this voltage is differentiated by a suitable RC coupling network, the derivative voltage is in the form shown at (c) in Figure 2; presence or absence of the sharp derivative pulse denoting a 1 or 0, respectively.

Patterns consisting of non-discrete signals in track 27a may be created by generating a flux in a chosen direction in the recording or writing magnet throughout the duration of a sequence of 1's and a flux in the opposite direction throughout the duration of a sequence of 0's the recording flux changing only when a 1 is followed by a 0 or when a 0 is followed by a 1. Thus, referring to Figure 3, when magnet 27 scans the recorded pattern the flux shifts from one level to the other only when the cell being scanned has a different value from the immediately preceding cell in that track. In other words, a positive or a negative voltage pulse is induced in the magnet winding only when a transition occurs. Bearing in mind that Figures 2 and 3 both represent the same digit values in a series of seven cells successively read by a magnet 27, it will be observed that in (a) of Figure 3, the flux in the magnet 27 does not return to M value except at a cell carrying a magnetization value corresponding to zero, whereas in (a) of Figure 2, the flux returns to M value after the magnet has read each cell and even if the cell has a value corresponding to the digit 1. The portion (b) of Figure 3 indicates the reading magnet signal voltage obtained under the conditions referred to in connection with that figure.

Figure 3:
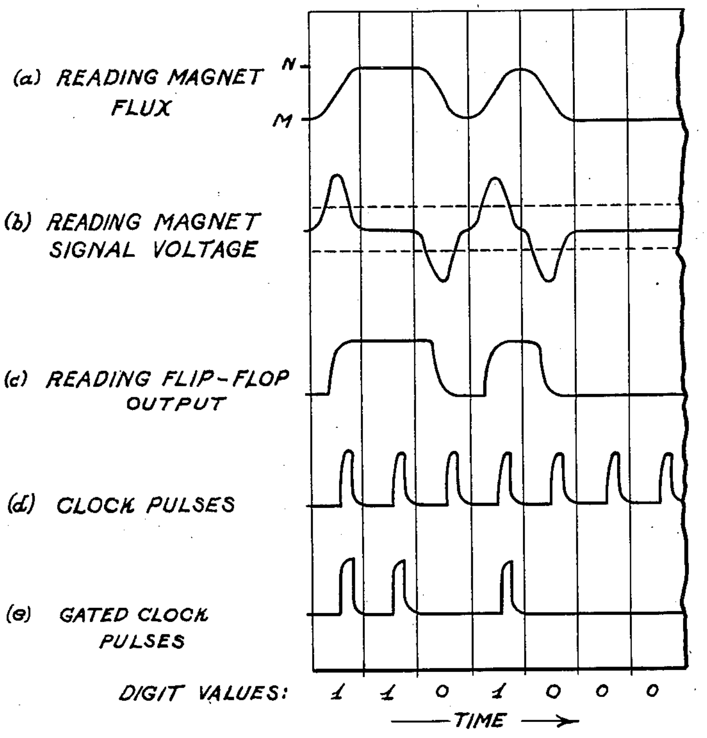
Figure 3 is a table diagrammatically illustrating the pattern of signals induced during another system of operation according to the invention.

The system designated in Figure 3, which may be called a "non-return-to-zero" system, has certain advantages over the "return-to-zero" system or method of Figure 2. In more detail, if the cell period is the same in both cases, it is evident that the maximum frequency which the magnet must handle in the Figure 3 system is just half the corresponding maximum frequency in the Figure 2 system. Furthermore, if the length per cell is the same in both cases, the shortest region of uni-directional magnetization is twice as long in the Figure 3 system. It follows that the magnets and para-magnetic tracks 27a in a given system will effectively store, with the Figure 3 pattern, twice as many pattern elements or digits per inch and permit scanning at twice the rate of the Figure 2 system. Therefore, in addition to the factors mentioned above as bearing upon access time, the use of the Figure 3 system will further decrease or shorten access time.

It will be noted that when digital patterns of the type discussed in connection with either of Figures 2 or 3 are used upon a digital track, and with a sine wave or other regularly varying pattern upon the timing track, the following condition will exist: While the stages of value of the digital pattern may vary lengthwise of the digital track (as from M and N of Figures 2 and 3), nevertheless, each stage of value will be in synchronism with the pattern of the timing track. The only differences between the two types of track-carried patterns or magnetizations is that those discussed in connection with Figure 2 will be spaced apart lengthwise of the track, or discrete, while those of Figure 3 will be non-discrete lengthwise of the track.

A further capability of the present invention is that of so coordinating the readings from the timing track 25 with the digital magnets 27 and their respective digital tracks 27a that the magnetic value of any desired digital cell may be selectively altered. More particularly, with a 1 represented on a digital path by a small area magnetized in one direction or polarity, and a 0 represented by a cell magnetized to a negative value, if it is desired to change the digit value of a given cell, the magnet 27 of the track 27a containing that cell will be pulsed in the appropriate direction at the time the cell is passing the air gap 28 of magnet 27. If synchronization and pulse shape are correct, as is possible with the arrangements discussed below, the digit value newly applied to the cell will be independent of, viz., will entirely replace, the digit value previously represented in the cell. By this procedure, it is not necesary to precede each writing operation with an erasing operation.

The selective alteration technique mentioned in the preceding paragraph may be used either for the return-to-zero (Figure 2) or the non-return-to-zero (Figure 3) patterns. With the Figure 2 system, the magnetized areas representing a repeated appearance of the digit 1 to which "positive" magnetization has been assigned must be discrete and separated by areas of reversed magnetic polarity. This reversed polarity is that assigned to 0, and this fact leads to the term "return-to-zero system." In the Figure 3 system the magnetized areas representing successive digits must be made to blend into a smooth, continuous envelope or pattern as in (a) of Figure 3. Also, with the Figure 3 system, the continuity of the envelope must be maintained when digit representations are individually altered in any order and the recorded magnetization pattern for a single digit must be shaped to provide this continuity.

It will be perceived that data carried in particular punched tapes or cards or in general by any carrier of digital data permitting convenient translation of the stored data to electrical pulses can be applied automatically to a track or tracks 27a. In general, the system is immediately applicable to any system involving discrete symbols, such as the digits 1 and 0 of binary arithmetic, the mark and space symbols of the ordinary teletype code, the alphabet as coded, for example, in terms of a standard teletype or Baudot code using marks and spaces, numbers expressed in decimal digits with these digits further coded in terms of four or more marks and spaces or binary digit type signals, etc.

Figure 4:
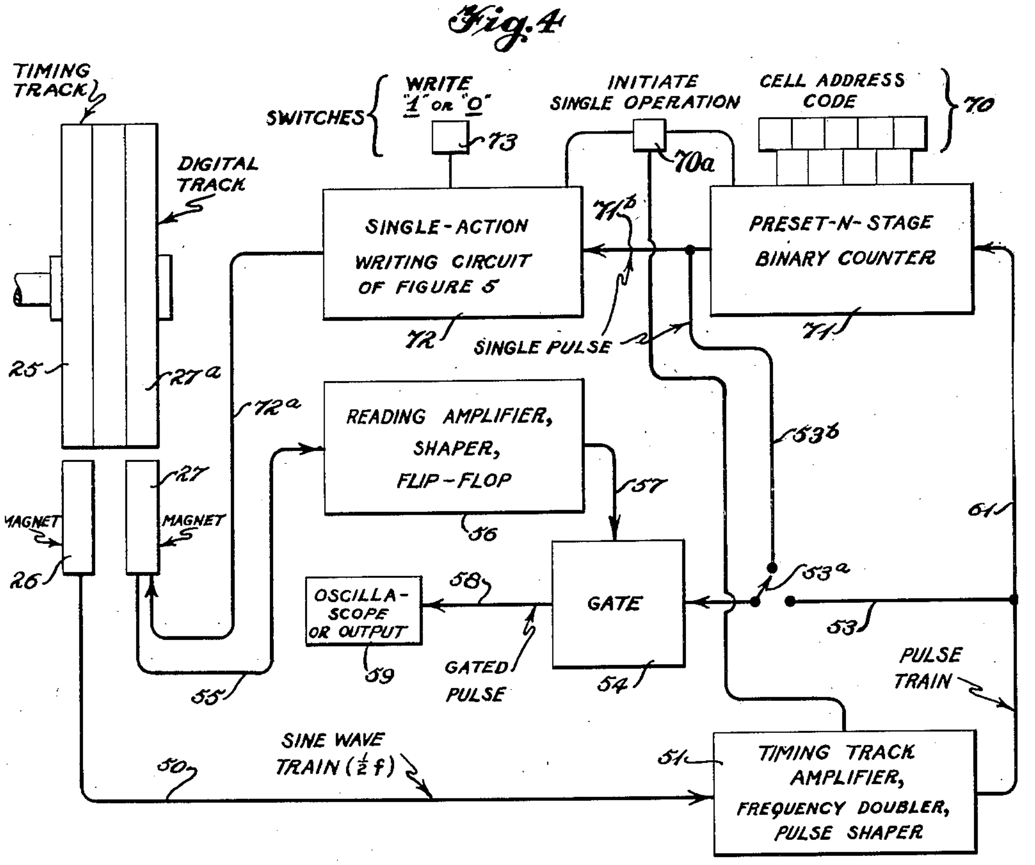
Figure 4 is a diagram of control circuits used in the invention.

Figure 4 is a simplified block diagram of a system included in the invention. For cell locating purposes, a train of at least as many pulses as there are cells on a digital track 27a must be supplied by the timing track 25 once in each revolution of the drum. Since these pulses determine the positioning of the cells on a digital track, the pulses must be generated at the cell scanning rate. A train of sine waves is permanently recorded on the timing track 25. The frequency of the sine wave voltage picked up from this track is one-half the cell repetition rate. The resultant signal induced in magnet 26 passes by line 50 to 51 where it is amplified and converted to a train of pulses occurring at cell frequency as indicated at d in Figure 3. Any well-known type of frequency converter may be employed to so double the frequency of the signal on line 50: the circuit shown in U. S. Patent No. 1,965,641, July 10, 1934, to Gurtler, is an example. The doubled frequency may then be passed through a half-wave rectifier and the uni-directional rectified half-waves clipped in the usual diode circuits to produce the pulses.

In an alternative system, the generated frequency may have one-half cycle thereof inverted in phase, as in a cathode follower type phase inverter, and the successive uni-directional waves clipped and shaped to produce pulses. A suitable cathode follower circuit is shown at page 302 of Termin, "Radio Engineering," third edition, McGraw-Hill Company, New York, 1947.

An N— digit binary number can be used as an address to specify one of $2^N$ or fewer cell positions. In this system, the address is manually set on N toggle switches 70. This presents an N— stage binary counter 71 so that, with "Initiate Single Operation" switch 70*a* properly operated, counter 71 will deliver an output pulse to line 71*b* when it has counted off the corresponding number of input pulses received from 51 through line 61. Any well-known binary counting circuit having a resetting arrangement may be used. This may be a chain counter as shown, for example, in U. S. Patent 2,407,320, September 10, 1946, to Miller. It will be understood that the switch 70*a* is the equivalent of the switch 148 of the above-mentioned Patent 2,407,320. With the toggle switches 70 preset, operation of switch 70*a* will reset the counter 71. 70*a* may be electrically operated by detection of the start point on track 25 through the lead extending between blocks 51 and 70*a* in Figure 4 to initiate a single operation of the counter on the following revolution of the drum. This output pulse triggers the writing circuit indicated at 72 at the proper instant, causing it to write into the cell specified by the address. Whether the writing circuit 72 writes a 1 or a 0 is preselected on another switch 73. The writing circuit will be described later.

In reading, the output from a signal track magnet 27 is fed by line 55 into an amplifier with suitable shaping circuits and an integrating flip-flop, all indicated at 56. The flip-flop shifts to one state on a positive pulse and to another state on a negative pulse. A suitable integrating flip-flop circuit is shown, for example, in U. S. Patent 2,050,059, August 4, 1936 to Koch. As stated at page 2, column 2, line 51, a negative signal potential on terminals 44 of Figure 2 of this patent will shift the circuit to one state of equilibrium, and as stated on page 3, column 1, line 4, a positive potential at the same terminal 44 will revert the circuit to the original state of equilibrium. The flip-flop output (*c* of Figure 3) operates a gate tube 54 to which the output of 51 passes over line 53 and through switch 53*a*. Hence, gate tube 54 delivers accurately timed pulses and blanks, representing 1, and 0's. The train of gated pulses (*e* of Figure 3) representing the contents of a sequence of cells, can be viewed on an oscilloscope 59.

This system may be expanded, for example, into a thirty digit parallel channel storage system, by providing thirty digital tracks similar to 27*a*. With these will be associated thirty magnets 27, and like numbers of writing circuits 72, reading circuits 56, and gates 54. To examine the digital contents of these thirty tracks would, of course, also require thirty oscilloscopes 59. If it is desired to examine, instead of a sequence of digits in each track, the thirty-digit number contained at a specific address on the tracks 27*a*, then switch 53*a* may be thrown to line 53*b*, instead of 53, enabling the single pulse from the counter 71 to be fed through gate 54 in place of the pulse train. The output appearing on the thirty lines 58 may be used to actuate a printing device, a section of an automatic computer, or other automatic mechanism adapted to be operated by electrical pulses.

In place of the toggle switches 70 and pre-set counter 71, an automatically operated locating circuit may be used which can be operated by signals from an automatic control device. This locator circuit might be, for example, a coincidence circuit which compares the N stages of the binary counter with the N stages of a register containing the desired address, and delivers a pulse when the desired coincidence arises.

Referring further to the operation of the devices 56 and 54, it will be understood that at the same time a timing pulse is generated in the timing head 26, the cell on a digital track 27*a* simultaneously passing beneath its digital magnet 27 will generate a signal in the latter head which will be delivered by line 55 to the elements designated at 56 including an amplifier, shaper and flip-flop. The flip-flop output corresponding to the reading indicated at (*a*) and (*b*) at Figure 3 will have the form indicated at (*c*) in Figure 3 and will pass through line 57 to the gating tube. As a result, with the digital values indicated in Figure 3 present on tracks 27*a*, the output of gating device 54 transmitted to the mechanism diagrammatically indicated at 59 will have the characteristics indicated at (*e*) in Figure 3.

In other words, the output of the flip-flop included at 56 will so control the gating tube or device 54 that such pulses originating on the timing track 25 as correspond to the digits 1 will pass through gating tube 54, while pulses corresponding to the digit 0 will be suppressed. Hence, whenever a cell in the digital track 27*a* gives a reading corresponding to the digit 1, the pulse from the corresponding cell of timing track 25 will pass through gating device 54, while whenever a cell on digital track 27*a* gives a reading corresponding to the digit 0, the pulse from the corresponding cell of timing track 25 will be suppressed; thus, the output from the gating tube 54 will have the values plotted against time in (*e*) of Figure 3.

Referring to Figure 5, which shows a writing circuit, it will be observed that pulses received over line 71*b* from counter 71 will fire either thyratron 75 or 76. The thyratrons 75 and 76 are respectively arranged to discharge an inductance-capacitance circuit through a recording or writing coil, either coil 77 for a "1" or coil 78 for a "0." The coils 77 and 78 are carried on a digital track magnet 27. It will be understood that thyratron 75 will be fired when a 1 is to be recorded, while the other thyratron 76 will be fired when a digit 0 is to be written. The thyratrons 75 nd 76 are triggered by impressing a pulse from line 71*b* on the control grids of the thyratrons. One of the thyratrons would be prevented from firing by applying a negative bias to its shield grid. If the writing circuit of Figure 5 is to be initiated by information received from a computer, this bias would be derived from one channel of the input register of the storage system.

Each winding 77 and 78 may be a ten-turn section. Half sine wave current pulses of 0.5 to 15 microseconds duration and up to 5 amperes in amplitude (50 ampere turns) are readily obtainable with this circuit by suitable choice of inductance and capacitance. For example, a one microsecond, 2.5 ampere pulse will be obtained with $L$=38.0 microhenries and $C$=.0026 microfarad. With these values, an entirely satisfactory digit representing pattern element can be applied to the digital tracks 27*a*.

A starting point will be established on the timing track 25. Hence, if it is desired to alter the value in one or more cells of a digital track, the pulses from the device 51 can be transmitted to a pulse counter. Then the pulse counter will act as a gate to control the transmission of the clock pulses to the selected cells of the digital track 27a containing the selected cell. If a cell has a value representing a 1, that value can be altered to a value representing a 0 by imprinting in the cell a pulse of opposite magnetic polarity. It is found that the last-applied value will be entirely intelligible under all of the operating conditions mentioned above.

In some cases, the wave form indicated at (a) of Figure 3 will contain ripples occurring at cell repetition frequency. The reading circuit must discriminate between ripples, which it must not follow, and transition pulses, which it must follow. However, such ripples can be suppressed by a filter in the reading amplifier.

It will be understood from the foregoing that the present invention is applicable to the control of numerous types of mechanisms and to record or store numerous types of data or information. Also, because the stored data can be selectively altered, the operation of any mechanism by the system of our invention likewise can be selectively changed. These characteristics render the system particularly useful in connection with automatic sequence controlled digital computers because coded instructions for the operation of the computer and the numbers upon which the computer operates can be stored, referred to, or changed.

While the track 25 primarily has been referred to as a timing signal or pattern track, it will be observed that, from a broad aspect, it is also a data representing track.

By using the non-return-to-zero system described above, 150 cells may be provided per inch of track 27a and these may be scanned at the rate of 210,000 cells per second, with the drum surface moving at a speed of 1,400 inches per second. Entirely satisfactory operation has been achieved with magnetized areas of the tracks one-sixteenth of an inch wide spaced on one-eighth inch centers, providing eight tracks per inch along the drum.

The terminology used in the specification is for the purpose of description and not of limitation, the scope of the invention being defined in the claims.

We claim:

1. In a data storage system, a rotatable member, means to rotate said member, said member being provided with a magnetizable periphery, a track for pattern elements of varying magnetic value extending circumferentially about the periphery of said member, a timing signal track extending circumferentially about the periphery of said member, a pair of magnets, one positioned adjacent each of said tracks, and means to deliver signals to the magnet of said first-mentioned track under control of signals induced by said timing signal track upon its magnet.

2. A data storage system of the character described in claim 1 including means to determine the value of the signals delivered to the magnet of said first-mentioned track.

3. A data storage system of the character described in claim 1 including means to count the signals induced by said timing signal track.

4. In a data storage system, a rotatable member, means to rotate said member, said member being provided with a magnetizable periphery, a track for pattern elements of varying magnetic value extending circumferentially about the periphery of said member, a timing signal track extending circumferentially about the periphery of said member, a pair of magnets, one positioned adjacent each of said tracks, means to count the signals induced by said timing track upon its magnet, and means effective upon a predetermined count to deliver a signal to the magnet of said first-mentioned track.

5. In a data storage system, a rotatable member, means to rotate said member, said member being provided with a magnetizable periphery, a track for pattern elements of varying magnetic value extending circumferentially about the periphery of said member, a timing signal track extending circumferentially about the periphery of said member, a pair of magnets, one positioned adjacent each of said tracks, means to count the signals induced by said timing track upon its magnet, means effective upon a predetermined count to deliver a signal to the magnet of said first-mentioned track, and means to determine the value of the delivered signal.

6. In a data storage system, a movable member, means to move said member, said member being provided with a magnetizable surface, a pair of tracks extending along said surface in the direction of movement of said member, one of said tracks carrying a pattern of regular form equidistantly spaced along its length, the second track carrying a pattern of value stages which vary lengthwise thereof but with each stage in synchronism with a signal on said first-mentioned track, and a pair of magnets, one fixed opposite each of said tracks.

7. A data storage system of the character described in claim 6 wherein the pattern carried by said second track is of non-discrete form.

8. In a data storage system, a base, a member movable with respect to the base, means to move the member, a magnetizable data signal track for magnetic data flux patterns of varying value extending along the member in the direction of movement of the member, a magnetizable synchronizing signal track for magnetic synchronizing flux patterns also extending along the member in the direction of movement of the member, magnetic transducing means positioned in operative relation adjacent each of the tracks, and control means connected with the transducing means of the synchronizing track for enabling the transducing means of the data track for transducing operations under control of predetermined signals induced in the synchronizing transducer means.

9. A data storage system of the character described in claim 8 wherein the patterns on said synchronizing track comprises a timing signal.

10. A data storage system of the character described in claim 8 wherein said control means includes a device to count signals received by the transducing means of the synchronizing track.

11. A data storage system of the character described in claim 8 wherein said control means includes a register device upon which the address of predetermined synchronizing patterns located upon said synchronizing track may be pre-set.

12. A data storage system of the character described in claim 8 wherein said data storage member is rotatable and includes a rigid periphery to carry said tracks.

13. A data storage system of the character described in claim 8 wherein said control means includes an electronic gating device.

14. A data storage system of the character described in claim 13 wherein the control means further includes a signal counting device.

15. A system as in claim 8 wherein the movable member is a rotatable drum and wherein the tracks extend circumferentially about the drum periphery.

16. A data storage system of the character described in claim 15 wherein the patterns on said synchronizing track comprise a timing signal.

17. A data storage system of the character described in claim 15 wherein said control means includes a device to count data received by one of said transducing means.

18. A data storage system of the character described in claim 15 wherein said control means includes a register device upon which the address of patterns located upon said synchronizing track may be pre-set.

19. A data storage system of the character described in claim 15 wherein said control means includes an electronic gating device to pass signals corresponding to data received by the data transducing means under the control of signals received from the synchronizing means.

20. A data storage system of the character described in claim 15 wherein said control means includes an electronic gating device to pass signals corresponding to those received by one of said transducing means under the control of signals received by the other of said transducing means, and a signal counting device.

21. A data storage system of the character described in claim 15 wherein said data transducing means is a reading magnet.

22. A data storage system of the character described in claim 15 wherein said data transducing means is a recording magnet.

23. In a data storage system a data storage element movable with respect to said base and provided with a pair of tracks extending therealong in its direction of movement, one of said tracks carrying timing signals spaced in regular order, the second of said tracks carrying signals of two different orders, a pair of members, one aligned with each of the respective tracks, said members being responsive to the signals on said tracks, a flip-flop circuit, means to deliver pulses to the input of said circuit in accordance with signals delivered to the member aligned with the second of said tracks, a gating tube, means to control said gating tube in accordance with signals received by said member aligned with the first of said tracks, the output of said flip-flop circuit being connected to said gating tube to control the output of the latter.

24. A data storage system of the character described in claim 23 wherein the track portions of said data storage element are formed of paramagnetic material and said members are magnets.

25. A data storage system of the character described in claim 23 wherein said data storage element is a drum rotatable on said base, said tracks are paramagnetic and extend circumferentially of the drum periphery, and said members are magnets.

26. In a data storage system, a base, a member movable with respect to the base, means to move the member, a magnetizable data signal track for magnetic data flux patterns of varying value extending along the member in the direction of movement of the member, a magnetizable synchronizing signal track for magnetic synchronizing flux patterns also extending along the member in the direction of movement of the member, magnetic transducing means positioned in operative relation adjacent each of the tracks, and control means connected with the transducing means of the synchronizing track for enabling the transducing means of the data track for transducing operations under control of predetermined signals induced in the synchronizing transducer means, the control means including, a timing pulse generating circuit having an input and output, the input being connected to the synchronizing transducing means, a writing pulse forming circuit having its output connected to the data transducing means, the writing circuit having a triggering means, and means to connect the writing circuit triggering means to the output of the timing pulse generating circuit to trigger the writing circuit under control of predetermined timing pulses obtained from the timing pulse generating circuit.

27. In a data storage system, a base, a member movable with respect to the base, means to move the member, a magnetizable data signal track for magnetic data flux patterns of varying value extending along the member in the direction of movement of the member, a magnetizable synchronizing signal track for magnetic synchronizing flux patterns also extending along the member in the direction of movement of the member, magnetic transducing means positioned in operative relation adjacent each of the tracks, and control means connected with the transducing means of the synchronizing track for enabling the transducing means of the data track for transducing operations under control of predetermined signals induced in the synchronizing transducer means, the control means including, a timing pulse generating circuit having an input and output, the input being connected to the synchronizing track transducing means, a writing pulse forming circuit having its output connected to the data track transducing means, the writing circuit having a triggering means, and means to connect the writing circuit triggering means to the output of the timing pulse generating circuit to trigger the writing circuit under control of predetermined timing pulses obtained from the timing pulse generating circuit, the synchronizing track containing equally spaced flux patterns, whereby the output of the timing pulse generating circuit comprises a train of equally spaced pulses occurring in synchronism with rotation of the storage member, and wherein the writing circuit is arranged to produce a pulse when triggered which is of such time duration that the length of a flux pattern induced by the data transducing means into the data track will be insufficient to permit the pattern to abut flux patterns similarly induced in adjacent lengths of the data track, whereby the flux patterns in the data track will be of discrete form.

28. In a data storage system, a base, a member movable with respect to the base, means to move the member, a magnetizable data signal track for magnetic data flux patterns of varying value extending along the member in the direction of movement of the member, a magnetizable synchronizing signal track for magnetic synchronizing flux patterns also extending along the member in the direction of movement of the member, magnetic transducing means positioned in operative relation adjacent each of the tracks, and control means connected with the transducing means of the synchronizing track for enabling the transducing means of the data track for transducing operations under control of predetermined signals induced in the synchronizing transducer means, the control means including, a timing pulse generating circuit having an input and output, the input being connected to the synchronizing track transducing means, a writing pulse forming circuit having its output connected to the data track transducing means, the writing circuit having a triggering means, and means to connect the writing circuit triggering means to the output of the timing pulse generating circuit to trigger the writing circuit under control of predetermined timing pulses obtained from the timing pulse generating circuit, the synchronizing track containing equally spaced flux patterns, whereby the output of the timing pulse generating circuit comprises a train of equally spaced pulses occurring in synchronism with rotation of the storage member, and wherein the writing circuit is arranged to produce a pulse when triggered which is of such time duration that the length of a flux pattern induced by the data transducing means into the data track will be sufficient to permit the pattern to abut flux patterns similarly induced in adjacent lengths of the data track, whereby the flux patterns in the data track will be of non-discrete form.

29. A system as in claim 27 wherein means are provided for altering the direction of the flux patterns induced by the data transducing means into the data track, whereby predetermined flux patterns in the data track may be selectively altered.

30. A system as in claim 28 wherein means are provided for altering the direction of the flux patterns induced by the data transducing means into the data track, whereby predetermined flux patterns in the data track may be selectively altered.

31. In a data storage system, a base, a member movable with respect to the base, means to move the member, magnetizable data signal tracks for magnetic data flux patterns of varying value extending along the member in the direction of movement of the member, a magnetizable synchronizing signal track for magnetic synchronizing flux patterns also extending along the member in the direction of movement of the member, magnetic transducing means positioned in operative relation adjacent each of the tracks, and control means connected with the transducing means of the synchronizing track for enabling the transducing means of the data tracks for transducing operations under control of predetermined signals induced in the synchronizing transducer means.

ARNOLD A. COHEN.
WILLIAM R. KEYE.
CHARLES B. TOMPKINS.

REFERENCES CITED

The following references are of record in the file of this patent:

UNITED STATES PATENTS

| Number | Name | Date |
|---|---|---|
| 1,883,907 | Hathaway | Oct. 25, 1932 |
| 2,150,256 | Warren | Mar. 14, 1939 |
| 2,213,246 | Heller | Sept. 3, 1940 |
| 2,373,145 | Sensiper et al. | Apr. 10, 1945 |

FOREIGN PATENTS

| Number | Country | Date |
|---|---|---|
| 244,081/3 | Germany | June 3, 1909 |